Sept. 30, 1952   W. F. MacGLASHAN, JR   2,612,389
VALVED PIPE COUPLING
Filed Aug. 1, 1950
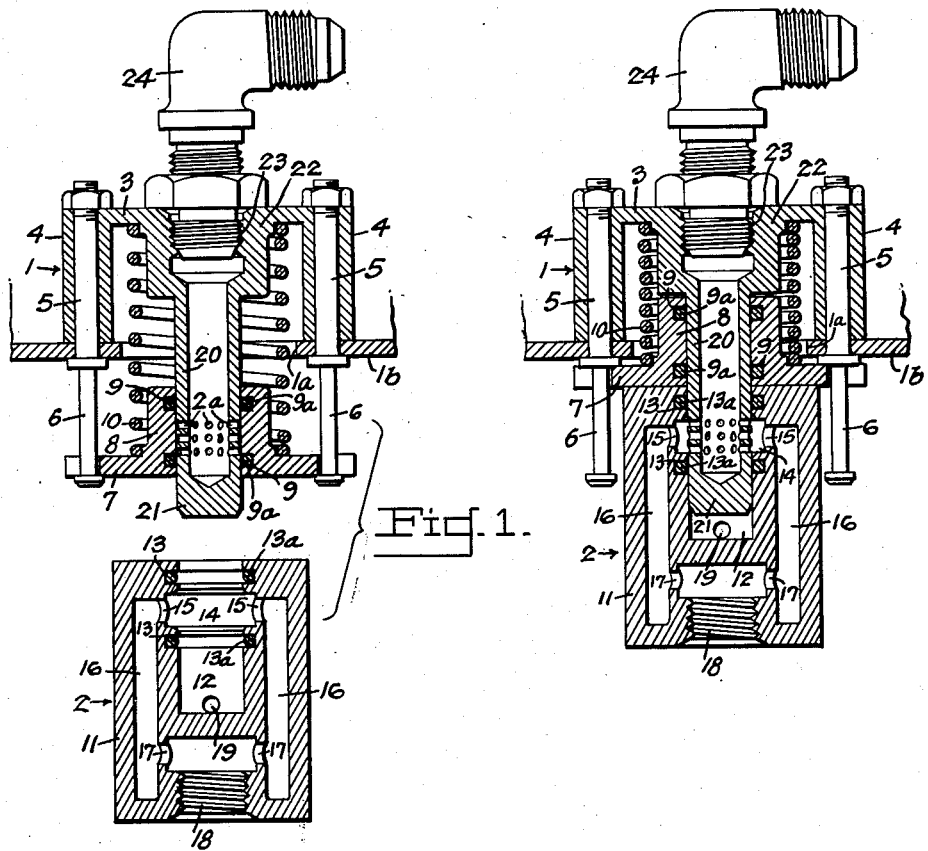
Inventor
William F. MacGlashan, Jr.
By G. J. Kessenich & J. H. Church
Attorneys Patented Sept. 30, 1952

2,612,389

UNITED STATES PATENT OFFICE 2,612,389

VALVED PIPE COUPLING

William F. MacGlashan, Jr., Alhambra, Calif., assignor to United States of America as represented by the Secretary of the Army Application August 1, 1950, Serial No. 177,055

2 Claims. (Cl. 284—19)

This invention relates to coupling valves including separable fluid coupling members and more specifically to a coupling valve designed to permit the supplying of air to an air tank of a rocket from an external source.

An object of the invention is a coupling valve arranged so that the air line within the rocket is automatically sealed when the coupling members of the valve are separated.

Another object of the invention is the balancing of pressure areas in such a way that the air pressure within the coupling members does not exert a force tending to disconnect the coupling members.

The specific nature of the invention as well as other objects and advantages thereof will clearly appear from the following description and accompanying drawings in which:

Fig. 1 is a longitudinal sectional view through the valve showing the coupling members separated.

Fig. 2 is a longitudinal sectional view through the valve showing the coupling members assembled.

Referring now to the drawings by characters of reference, there is shown the coupling units 1 and 2. The coupling unit 1 is mounted in the rocket and has a portion extending exteriorly thereof through an aperture 1a in the exterior wall 1b of the rocket body.

The coupling unit 1 includes a generally cuplike body having a tubular hollow stem 20 reentrant from the base thereof and which is closed at its extended end 21 and is provided adjacent the end 21 with a series of laterally directed ports 2a. The other extremity 22 of the stem is internally provided with threads 23 for engagement with a suitable fitting 24 to an air tank in the rocket, not shown. A mounting flange 3 formed on the extremity 22 has mounting posts 4 extending therefrom and parallel to said stem in engagement with the inside surface of the wall 1b. Bolts 5 extending through the mounting posts 4, include outwardly projecting guide rods 6 which support by means of a flange 7, a collar 8 in slidable relationship with the stem 20. The collar 8 is provided with internal grooves 9 adjacent each longitudinal extremity. A sealing ring 9a is positioned in each groove. The space between the rings is greater than that occupied by the lateral ports 2a. When the collar 8 is in its extended position, as shown in Fig. 1, the ports 2a are sealed by the rings 9a in cooperation with slidable collar 8. A helical spring 10 surrounding the stem 20 and normally holding the collar 8 in extended sealing position has one end in contact with the flange 3 and its opposite end in contact with the flange 7.

The coupling unit 2 includes a cylindrical body 11 having a socket 12 formed in one end and extending inwardly thereof. In the socket 12 are spaced internal grooves 13 which receive sealing rings 13a separated axially substantially the same distance as that between the rings 9a in the collar 8. Between the sealing rings 13a the socket 12 is provided with an internal recess 14 which communicates with lateral ports 15 formed internally in the body 11. The ports 15 communicate with longitudinal passages 16 in the body 11 parallel to the socket 12. The passages 16 communicate in turn with other lateral passages 17 formed in the body and intersecting a threaded bore 18 in the opposite end of the body. The walls of the socket 12 are provided with relief ports 19 to permit the escape of occluded air and airlock in the socket.

In operation of the coupling valve the socket 12 in the body 11 is fitted over the stem 20 and forced down the stem, displacing the collar until the ports 2a are sealed between the rings 13a. It will be observed that the pressure areas in the body 11 are balanced and, therefore, irrespective of the pressure of the air, there is no resultant axial force tending to remove the body 11 from the stem except that exerted by the spring 10.

I claim:

1. A separable fluid coupling comprising a pair of telescopically interfitting parts, the first of said parts comprising a generally cup like body having from the base thereof a reentrant hollow stem to form a fluid passageway, said stem having a first internally threaded end and a second closed end, and having a plurality of lateral ports adjacent said closed end, a sleeve surrounding the closed end of said stem adjacent said lateral ports, means supporting said sleeve on said body for axial movement from first position closing said ports to second position to open said ports and comprising a pair of posts fixedly received in diametrically opposed longitudinal bores formed in said body disposed radially outwardly of said stem, said posts extending beyond said body, and an outwardly struck flange on said sleeve apertured to slidably engage said post extensions, resilient means about said stem biasing said sleeve into port closing position, said second part comprising a hollow cylindrical body having a first closed end lying in abutting engagement with said slidable sleeve, and a second closed end opposed to said first end, each said ends having central axially alined bores, a sleeve extending between said ends in said cylindrical body integral with said body and concentric therewith and having a longitudinal bore in axial alinement with the bores in said closed ends, the outer wall of said sleeve being radially spaced inwardly of the inner wall of said cylindrical body to provide an elongated annular passageway therebetween, a transverse wall in said sleeve intermediate said opposed ends and with the bore in the sleeve forming on the side adjacent the abutting end of said cylindrical body a socket providing a friction fit about the closed end of said hollow stem, the wall of said socket having a first plurality of lateral ports communicating on one side with said elongated passageway and on the other side with the lateral ports in said stem when said first and second parts are telescopically interfitted, the wall of said sleeve having a second plurality of lateral ports on the side of said transverse wall opposed to said socket, said second plurality of lateral ports communicating on one end with said longitudinal bore in said sleeve, and on the other end with said elongated passageway.

2. The combination in claim 1 including a pair of sealing members in said slidable sleeve encircling said stem and axially separated to lie on opposite sides of the lateral ports in said stem when said sleeve is in port closing position, and a pair of sealing members in the wall of said socket and axially separated to lie on opposite sides of the lateral ports in said socket, and on opposite sides of the lateral ports in said stem when said parts are telescopically interfitted.

WILLIAM F. MACGLASHAN, JR.

REFERENCES CITED

The following references are of record in the file of this patent:

UNITED STATES PATENTS

| Number | Name | Date |
|---|---|---|
| 768,965 | Strasburger | Aug. 30, 1904 |
| 999,392 | Meyer | Aug. 1, 1911 |
| 1,118,506 | Melas | Nov. 24, 1914 |
| 1,968,421 | Proctor | July 31, 1934 |
| 2,356,326 | Lebus | Aug. 22, 1944 |
| 2,393,679 | Gunderson | Jan. 29, 1946 |
| 2,398,170 | Williams-Foxcroft | Apr. 9, 1946 |
| 2,471,237 | Pasturczak | May 24, 1949 |